(12) United States Patent
Jiang et al.

(10) Patent No.: US 7,744,673 B2
(45) Date of Patent: Jun. 29, 2010

(54) HOLLOW SPHERE METAL OXIDES

(75) Inventors: Xingmao Jiang, Albuquerque, NM (US); Charles Jeffrey Brinker, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 282 days.

(21) Appl. No.: 11/876,338

(22) Filed: Oct. 22, 2007

(65) Prior Publication Data
US 2008/0210053 A1 Sep. 4, 2008

Related U.S. Application Data

(60) Provisional application No. 60/854,933, filed on Oct. 27, 2006.

(51) Int. Cl.
*B22F 9/24* (2006.01)

(52) U.S. Cl. .............. 75/348; 75/370; 264/42

(58) Field of Classification Search ............... None
See application file for complete search history.

(56) References Cited

U.S. PATENT DOCUMENTS

| | | | |
|---|---|---|---|
| 4,775,598 A | 10/1988 | Jaeckel | |
| 4,871,693 A | 10/1989 | Inoue et al. | |
| 4,917,857 A | 4/1990 | Jaeckel et al. | |
| 5,061,682 A | 10/1991 | Aksay et al. | |
| 5,071,833 A | 12/1991 | Laine et al. | |
| 5,227,239 A | 7/1993 | Upadhye et al. | |
| 5,512,094 A * | 4/1996 | Linton | 106/409 |
| 6,602,439 B1 * | 8/2003 | Hampden-Smith et al. | 252/79.1 |
| 6,800,668 B1 | 10/2004 | Odidi et al. | |
| 2001/0039236 A1 | 11/2001 | Imhof et al. | |
| 2003/0082237 A1 | 5/2003 | Cha et al. | |
| 2003/0124564 A1 | 7/2003 | Trau et al. | |
| 2003/0148088 A1 | 8/2003 | Padmanabhan et al. | |
| 2003/0209693 A1 * | 11/2003 | Kijima et al. | 252/301.4 R |
| 2005/0123614 A1 * | 6/2005 | Kim et al. | 424/489 |
| 2006/0165787 A1 * | 7/2006 | Moerck et al. | 424/468 |

OTHER PUBLICATIONS

Torsten Brezesinski, Matthijs Groenewolt, Alain Gibaud, Nicola Pinna, Markus Antonietti, and Bernd M. Smarsly, "Evaporation-Induced Self-Assembly (EISA) at Its Limit: Ultrathin, Crystalline Patterns by Templating of Micellar Monolayers", Advanced Materials, 18, 2260-2263, 2006.

* cited by examiner

*Primary Examiner*—George Wyszomierski
(74) *Attorney, Agent, or Firm*—MH2 Technology Law Group LLP

(57) ABSTRACT

In accordance with invention, there are methods for fabricating hollow spheres and nanofoams. The method for making hollow spheres can include providing a homogeneous precursor solution including a first solvent and one or more anhydrous precursor species and forming aerosol droplets having a first size distribution using the homogeneous precursor solution in an anhydrous carrier gas. The method can also include transporting the aerosol droplets through an aerosol reactor including a reactant to form a plurality of hollow spheres, wherein each of the plurality of hollow spheres can be formed by one or more chemical reactions occurring at a surface of the aerosol droplet. The method can further include controlling size and thickness of the hollow spheres by one or more of the precursor solution concentration, aerosol droplet size, temperature, residence time of the aerosol droplets in the aerosol reactor, and the reactant distribution in the aerosol reactor.

25 Claims, 4 Drawing Sheets

```
                    400
                     ↘

┌─────────────────────────────────────────┐
    │  PROVIDE A HOMOGENEOUS PRECURSOR SOLUTION│  402
    │  COMPRISING A FIRST SOLVENT AND ONE OR MORE│
    │       ANHYDROUS PRECURSOR SPECIES        │
    └─────────────────────────────────────────┘

┌─────────────────────────────────────────┐
    │  FORM AEROSOL DROPLETS HAVING A FIRST SIZE│ 404
    │  DISTRIBUTION USING THE HOMOGENEOUS PRECURSOR│
    │     SOLUTION IN A ANHYDROUS CARRIER GAS   │
    └─────────────────────────────────────────┘

┌─────────────────────────────────────────┐
    │   TRANSPORT THE AEROSOL DROPLETS THROUGH AN│
    │   AEROSOL REACTOR COMPRISING A SECOND SOLVENT,│ 406
    │   WHEREIN ONE OR MORE CHEMICAL REACTIONS OCCURS│
    │   AT A SURFACE OF THE AEROSOL DROPLET TO FORM│
    │     PARTIALLY CONSOLIDATED HOLLOW SPHERE  │
    └─────────────────────────────────────────┘

┌─────────────────────────────────────────┐
    │  AGGREGATE PARTIALLY CONSOLIDATED HOLLOW SPHERE│ 408
    │            TO FORM NANOFOAM              │
    └─────────────────────────────────────────┘
```

FIG. 4

HOLLOW SPHERE METAL OXIDES

CROSS REFERENCE TO RELATED APPLICATION

This application claims priority to U.S. Provisional Patent Application Ser. No. 60/854,933 filed on Oct. 27, 2006, the disclosure of which is incorporated by reference herein in its entirety.

FEDERALLY SPONSORED RESEARCH

The present invention was made with government support under Grant No. NSF NIRT EEC0210835 awarded by the National Science Foundation and under USAF/AFOSR Prime Grant No. F49620-01-1-0352 awarded by the United States Air Force, through Subaward No. SC GG10306113743 from MURI/University of Virginia. As a result, the government has certain rights in this invention.

FIELD OF THE INVENTION

The present invention relates to hollow spheres and nanofoams and, more particularly, to methods for fabricating hollow sphere structures and nanofoams.

BACKGROUND OF THE INVENTION

Nano- or submicron-sized hierarchic structures such as hollow spheres and capsules have been attracting increasing attention, owing to their wide applications in drug delivery, low dielectric constant substrates, chemical and biological sensing and labeling, optoelectronics, catalysis, wave scattering, lasing, and photonics. Controlled release of heat sensitive drugs such as enzyme, vaccine, peptide, gene, and oligonucleotide from the nanocapsules is important for treatment of cancers and infections due to the improved therapeutic index. Intricate interfacial polymerization or polyelectrolyte layer-by-layer nanoassembly has been widely applied to fabricate protective nanocapsule shells capable of preventing oxidation/degradation of the encapsulated agents. Fast disintegration and easy degradation of the nanocapsule shells after oral or parenteral administration and the difficulty with maintaining the stability of nanocapsules suspensions impede its medical applications and industrial development. Ceramic materials show promise because they are less toxic, possess good thermal and chemical stability, and are biocompatible. Interfacial transport and phase separation play a role in the nanofabrication, and good control of the nanostructure needs an optimization of generation conditions based on proper analysis and design of the multiple-phase chemical engineering problem. Electro-hydrodynamic force has been applied to generate steady coaxial jets of immiscible liquids and fabricate nanocapsules of aqueous-based ingredient. Hollow spherical indium and zinc sulfide have been synthesized via a template-free solvothermal route at high temperature. The so-called hollow sphere structures are composed of many aggregated particles, far from perfect for desired shape and sizes. Fabrication via vapor-solid interfacial reaction such as laser ablation, molecular beam epitaxy, and chemical vapor deposition requires long process time, and high vacuum and temperature. The shells of nano hollow spheres of tailored dimensions and compositions for Au, Ag, CdS, ZnS, silica, or titania can be self-assembled in the presence of surfactants or sacrificial templates such as preformed rigid inorganic nanoparticles or in-situ polymerized cores such as carbon spheres, polystyrene latex beads, silica colloids, or block copolymer vesicles. The sacrificial templates or surfactants, however, have to be removed by time consuming high temperature calcination or solvent extraction, and most of times the removal leaves behind cracks, defects, or carbonaceous impurities with the hollow nanospheres. Furthermore, the engaged toxicity/pollution by the surfactants and solvents to the drug or target biological medium precludes their usage in the applications.

Aerosol methods are promising in that droplet and particle size, size homogeneity, evaporation rate, vapor-liquid interfacial transport, and reaction kinetics can be well controlled, and the process can be easily scaled up. Aerosol assisted evaporation induced self assembly (EISA) has been successfully applied to make ordered core shell nano structures Although metal oxide nano hollow spherical particles can be formed by thermal decomposition and succeeding surface gelation via aerosol pyrolysis, the method can not be applied to fabricate hollow spherical titania or germania from their highly reactive precursors without templating and/or controlling the interfacial diffusion of reactant molecules. To encapsulate heat sensitive biological materials the fabrication temperature is limited.

Accordingly, there is a need for developing a general, low-temperature, low cost, template free, nondestructive fabrication method for the metal oxide nanostructures.

SUMMARY OF THE INVENTION

In accordance with the various embodiments of the present teachings, there is a method for fabricating hollow spheres. The method can include providing a homogeneous precursor solution including a first solvent and one or more anhydrous precursor species and forming aerosol droplets having a first size distribution using the homogeneous precursor solution in an anhydrous carrier gas. The method can also include transporting the aerosol droplets through an aerosol reactor including a reactant to form a plurality of hollow spheres, wherein each of the plurality of hollow spheres can be formed by one or more chemical reactions occurring at a surface of the aerosol droplet. The method can further include controlling size and thickness of the hollow spheres by one or more of the precursor solution concentration, aerosol droplet size, temperature, residence time of the aerosol droplets in the aerosol reactor, and the reactant distribution in the aerosol reactor.

According to various embodiments of the present teachings, there is a method for fabricating nanofoam. The method can include providing a homogeneous precursor solution including a first solvent and one or more anhydrous precursor species and forming aerosol droplets having a first size distribution using the homogeneous precursor solution in an anhydrous carrier gas. The method can also include transporting the aerosol droplets through an aerosol reactor including a reactant, wherein one or more chemical reactions occurs at a surface of the aerosol droplet to form partially consolidated hollow sphere. The method can further include aggregating partially consolidated hollow spheres to form nanofoam.

Additional advantages of the embodiments will be set forth in part in the description which follows, and in part will be obvious from the description, or may be learned by practice of the invention. The advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

FIG. 4 shows an exemplary method for fabricating nanofoam, according to various embodiments of the present teachings.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. $-1$, $-2$, $-3$, $-10$, $-20$, $-30$, etc.

Figure 1:
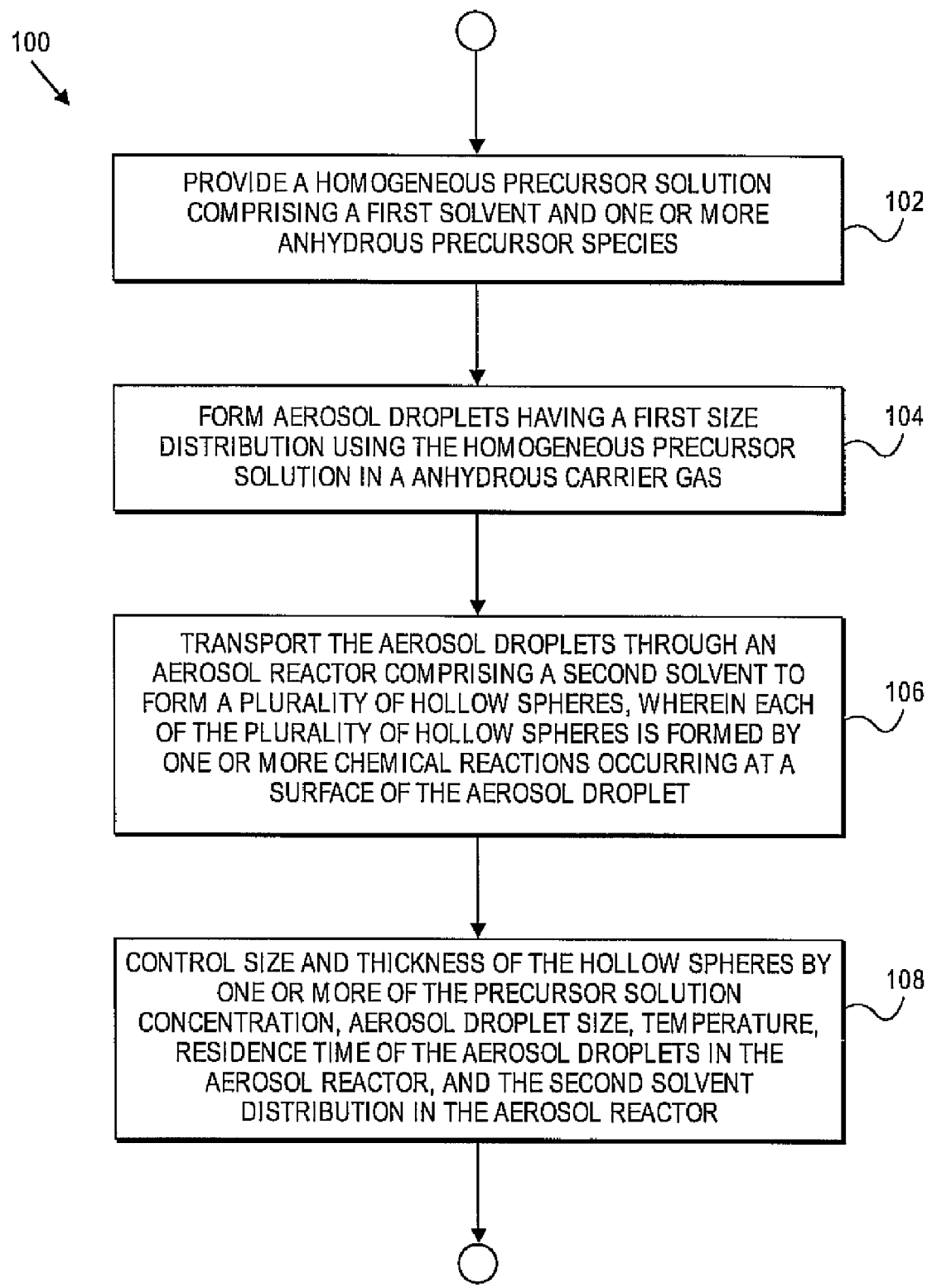
FIG. 1 shows an exemplary method for fabricating hollow spheres, according to various embodiments of the present teachings.

FIG. 1 shows an exemplary method 100 for fabricating hollow spheres. The method 100 can include providing a homogeneous precursor solution including a first solvent and one or more anhydrous precursor species, as shown in step 102. In various embodiments, the precursor species can include one or more of metal alkoxides and metal chlorides. In some embodiments, the precursor species can include one or more of tin, germanium, titanium, silicon, zinc, zirconium, cadmium, lead, and mercury. In other embodiments, the first solvent can include one or more anhydrous volatile inert hydrophobic solvents, such as, for example, butane, pentane, hexane, chloroform, and dichloromethane. The precursor solution can have a concentration in the range of about 0.1 weight % to about 30 weight %. The method 100 can also include forming aerosol droplets having a first size distribution using the homogeneous precursor solution in an anhydrous carrier gas, as shown in step 104. In some embodiments, aerosol droplets can be generated using an atomizer operated with dry nitrogen as the atomizing/carrier gas. In various embodiments, the aerosol droplets can have a diameter from about 0.1 μm to about 100 μm. The method 100 can further include transporting the aerosol droplets through an aerosol reactor including a reactant, thereby forming a plurality of hollow spheres, as in step 106, wherein each of the plurality of hollow spheres can be formed by one or more chemical reactions occurring at a surface of the aerosol droplet. In various embodiments, the reactant can include one or more reactive gases. In certain embodiments, the reactant can react with the precursor species to form the hollow spheres. In some embodiments, the reactant can include water. In other embodiments, the reactant can include one or more of hydrogen sulfide, volatile sulfides, hydrogen, and aldehydes. In various embodiments, the aerosol reactor can be a long glass tube. In other embodiments, the aerosol reactor can be designed with optimized aerosol generation conditions. In some other embodiments, the aerosol reactor can be designed with optimized residence time, such as, for example, from about 0.1 second to about 100 second. Sufficient residence time is needed for substantial solvent evaporation, substantial condensation, and consolidation of mechanically robust hollow spheres. If the residence time is not sufficient, partially consolidated hollow spheres can aggregate to form foam. In various embodiments, the aerosol reactor can also be designed to have optimum humidity and catalyst distributions. In some embodiments, the relative humidity can increase from about 0 to about 90% along the length of the aerosol reactor. In general, a humidity distribution which increases with evaporation process/aerosol reactor is desirable. The method 100 can also include controlling size and thickness of the hollow spheres by one or more of the precursor solution concentration, aerosol droplet size, temperature, residence time of the aerosol droplets in the aerosol reactor, and the reactant distribution in the aerosol reactor, as in step 108. In various embodiments, the hollow spheres can have an outer diameter from about 20 nm to about 30 μm and the shell can have a thickness from about 5 nm to about 500 nm. In various embodiments, the method 100 can also include converting the metal oxide shell to a metal shell. Any suitable method can be used for the conversion of the metal oxide shell to a metal shell, such as, for example, reduction under hydrogen. In some embodiments, the method 100 can further include annealing the plurality of hollow spheres to convert the hollow spheres from an amorphous state to a multicrystalline state. In other embodiments, annealing can be carried out at a temperature in the range of about 200° C. to about 600° C.

In various embodiments, the method 100 can include forming hollow spheres having one or more of a metal shell and a metal sulfide shell, wherein the metal is selected from the group consisting of silver, copper, gold, platinum, palladium, zinc, zirconium, cadmium, lead, and mercury. In some embodiments, for the formation of hollow sphere including one or more of a metal shell and a metal sulfide shell, one can include reactant other than water. Exemplary reactants can include one or more of hydrogen sulfide, volatile sulfides, hydrogen, and aldehydes.

Figure 2A:
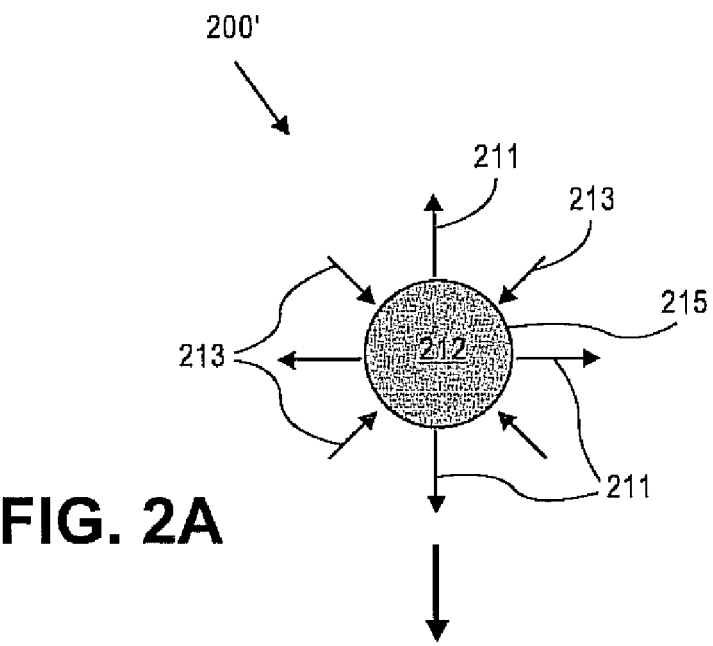
FIGS. 2A-2D schematically illustrate fabrication of hollow spheres by evaporation induced self-assembly, in accordance with the present teachings.
Figure 2B:
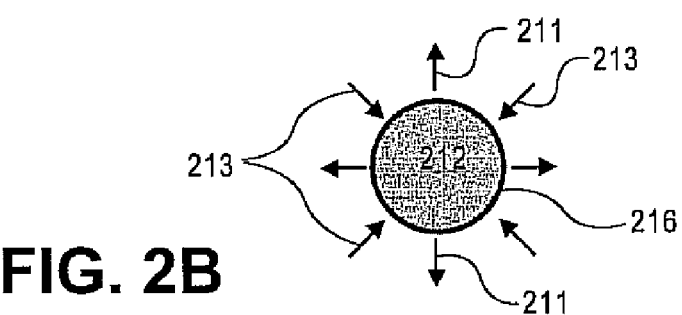
Figure 2C:
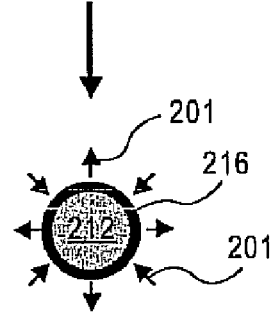
Figure 2D:
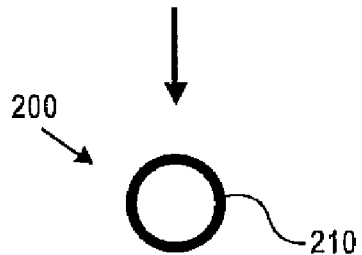

FIGS. 2A-2D schematically illustrate fabrication of hollow spheres 200 by diffusion controlled aerosol assisted evaporation induced self-assembly. FIG. 2A shows an aerosol droplet 200' including a precursor solution 212 including one or more anhydrous volatile inert hydrophobic solvents and precursor species. The arrows 211 show the direction of outward diffusion of the first solvent, wherein the first solvent can include one or more anhydrous volatile inert hydrophobic solvents. The arrows 213 show the inward diffusion of the reactant, such as, for example water. Low water solubility in the hydrophobic first solvent and low humidity in the gas phase can minimize the driving force for water diffusion across and within the aerosol droplets 200' so that the hollow sphere formation can be controlled by water diffusion, i.e. the reactant diffusion. Quick evaporation of the first solvent shown by arrows 211 can result in steep concentration gradients for the first solvent and the precursor species at the aerosol droplet's surface 215. Net water flux across the gas-liquid interface 215 can be determined by inward water diffusion 213 subtracted by the counterpart from convection due to quick evaporation. FIGS. 2B and 2C shows that the highly reactive precursor species of the precursor solution 212 can react with the diffused water by hydrolysis/condensation to form a growing condensed gel layer/nucleation sites 216 on the aerosol droplet's surface 215. In various embodiments, with the receding hydrophobic liquid phase and growing condensed gel layer/nucleation sites 216, the gel layer/nucleation sites 216 can provide a mass transport barrier for the hydrophobic first solvent and the water molecules. With the quenching of the inside net water flux, the inward growth of the gel layer 216 can be inhibited. Continuous diffusion of the precursor species to the gelled interface 216 can deplete the aerosol droplet 200' of the precursor molecules, favoring the formation of hollow spheres 200, as shown in FIG. 2D.

In various embodiments, for the less reactive precursor species, a catalyst can be added to the reactant to speed up the hydrolysis/condensation reaction and also for quick elimination of diffused water near aerosol droplet surface 215. In some embodiments, the catalyst can be selected from the group consisting of ammonia, organic amines, hydrogen chloride, and organic acids. Exemplary organic amine can include triethylamine. Exemplary organic acid can include acetic acid.

Figure 3:
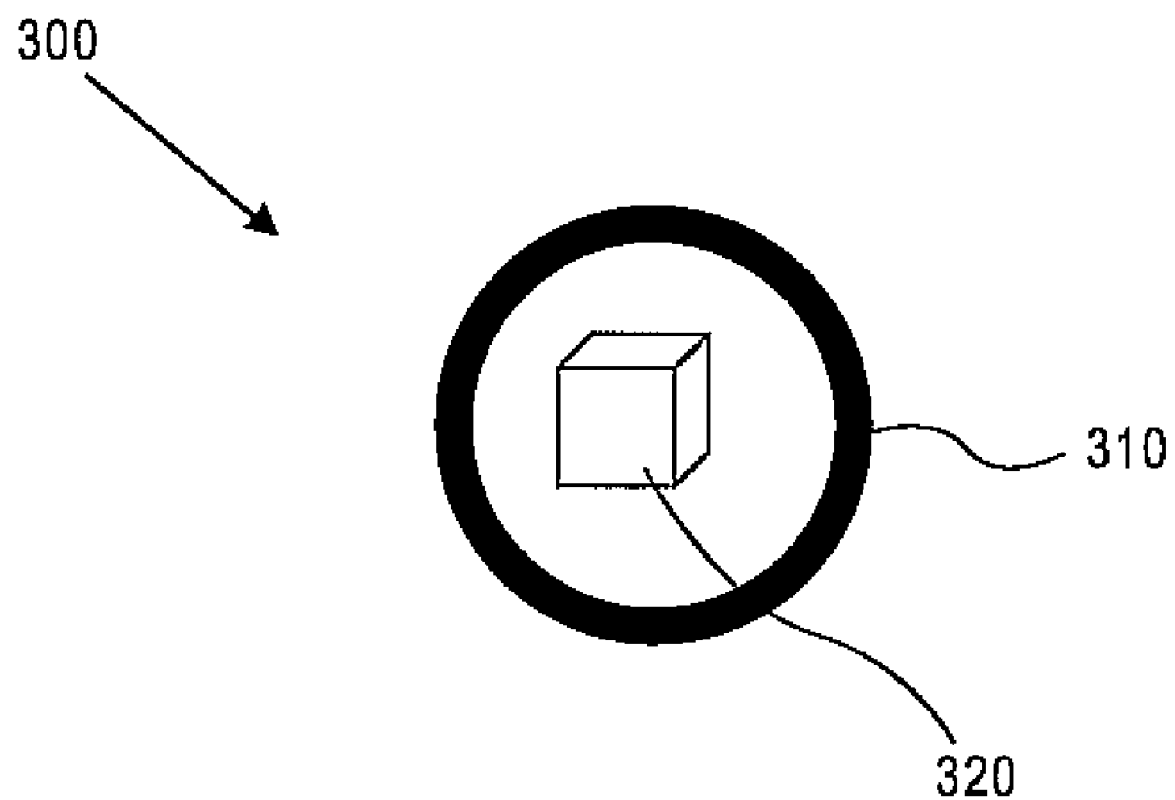
FIG. 3 illustrates an exemplary hollow sphere including an encapsulated pharmaceutical composition, in accordance with the present teachings.

In various embodiments, the exemplary method 100 for fabricating hollow spheres can further include encapsulating one or more pharmaceutical composition in the hollow sphere. In an exemplary method, caffeine can be selected as a model drug to be encapsulated in a titania hollow sphere. The method can include forming a ternary solution including caffeine, titanium isopropoxide, and dichoromethane in a molar ratio of about 1:2:90 to about 1:3.5:90. The method can further include forming aerosol droplets using the ternary solution in an anhydrous gas, such as, for example, nitrogen. The method can also include transporting the aerosol droplets through an aerosol reactor including water, wherein phase separation of condensed hydrophilic shell with receding hydrophobic solution can result in caffeine encapsulation. FIG. 3 schematically illustrates a cubic caffeine nanocrystallite 320 encapsulated inside a titania shell 310 of a titania hollow sphere 300. The final nanostructure of the encapsulated species can be controlled by the initial composition, temperature, residence time, and humidity and catalyst distribution. In some embodiments, nucleation and crystallization within limited space can favor formation of single crystals of caffeine from the ternary precursor solution. In various embodiments, biological and chemical compatible urea can be used as complexing and templating agent to regulate the pore size and release of encapsulated drugs through the porous titania shell 310 after urea dissolution in a biological medium.

In various embodiments, the method 100 can further include forming hollow spheres including encapsulated one or more of quantum dots, magnetic nanoparticles, and preformed nanocrystallites for one or more of medical application, controlled release, laser, sensor, and photonics. In order to form encapsulated hollow spheres, the precursor species can include one or more of quantom dots, magnetic nanoparticles, and preformed nanocrystallites.

FIG. 4 shows an exemplary method 400 for fabricating nanofoam. The method 400 can include providing a homogeneous precursor solution including a first solvent and one or more anhydrous precursor species, as in step 402. In various embodiments, the first solvent can include one or more anhydrous volatile inert hydrophobic solvents. In some embodiments, the precursor species can include one or more of metal alkoxides and metal chlorides. The method can also include forming aerosol droplets having a first size distribution using the homogeneous precursor solution in an anhydrous carrier gas, as shown in step 402. The method 400 can further include transporting the aerosol droplets through an aerosol reactor including a reactant, wherein one or more chemical reactions occurs at a surface of the aerosol droplet to form partially consolidated hollow sphere, as in step 406 and aggregating partially consolidated hollow spheres to form nanofoam, as in step 408. In various embodiments, the reactant can include one or more reactive gases. In some embodiments, the reactant can react with the precursor species to form the partially consolidated hollow spheres. In some embodiments, the reactant can include water and the nanofoam can include one or more of a metal oxide and a metal. In other embodiments, the reactant can include one or more of hydrogen sulfide, volatile sulfides, hydrogen, and aldehydes and the nanofoam can include one or more of a metal shell and a metal sulfide shell. In various embodiments, the nanofoam can include one or more of pharmaceutical compositions, quantom dots, magnetic nanoparticles, and preformed nanocrystallines.

Exemplary applications of nanofoams include, but are not limited to, power storage, spintronic applications, medical imaging, low-dielectric constant dielectrics, high performance catalysts for fuel cells, petrochemical processes, and the reduction of emissions of nitrogen oxides from internal combustion engines and coal-fired power plants. Nanofoams can also be used to increase the sensitivity of the biomedical detectors and to enhance heat transfer of jet-turbine blades while decreasing their weight.

While the invention has been illustrated respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of" for example A, B, and C means any of the following: either A, B, or C alone; or combinations of two, such as A and B, B and C, and A and C; or combinations of three A, B and C.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for fabricating hollow spheres comprising:
providing a homogeneous precursor solution comprising a first hydrophobic solvent and one or more anhydrous precursor species;
forming aerosol droplets having a first size distribution using the homogeneous precursor solution in an anhydrous carrier gas;
transporting the aerosol droplets through an aerosol reactor containing a reactant to form a plurality of hollow spheres, wherein each of the plurality of hollow spheres is formed by one or more chemical reactions occurring at a surface of the aerosol droplet; and controlling size and thickness of the hollow spheres by one or more of the precursor solution concentration, aerosol droplet size, temperature, residence time of the aerosol droplets in the aerosol reactor, and the reactant distribution in the aerosol reactor.

2. The method of claim 1, wherein the first hydrophobic solvent comprises one or more anhydrous volatile inert hydrophobic solvents and the reactant comprises water.

3. The method of claim 2, wherein the precursor species comprises one or more of metal alkoxides and metal chlorides.

4. The method of claim 3, wherein the precursor species comprises one or more of tin, germanium, titanium, silicon, zinc, zirconium, cadmium, lead, and mercury.

5. The method of claim 3, wherein the hollow sphere comprises a metal oxide shell.

6. The method of claim 5 further comprising converting the metal oxide shell to a metal shell.

7. The method of claim 1 further comprising annealing the plurality of hollow spheres to convert the hollow spheres from an amorphous state to a multi-crystalline state.

8. The method of claim 1, wherein the first hydrophobic solvent comprises one or more anhydrous volatile inert hydrophobic solvents and the reactant comprises one or more of hydrogen sulfide, volatile sulfides, hydrogen, and aldehydes.

9. The method of claim 8, wherein the hollow sphere comprises one or more of a metal shell and a metal sulfide shell.

10. The method of claim 9, wherein the metal is selected from the group consisting of silver, copper, gold, platinum, palladium, zinc, zirconium, cadmium, lead, and mercury.

11. The method of claim 1, wherein the aerosol reactor further contains a catalyst.

12. The method of claim 11, wherein the catalyst comprises one or more of ammonia, organic amines, hydrogen chloride, and organic acids.

13. The method of claim 1, wherein the homogeneous precursor solution further comprises one or more pharmaceutical compositions.

14. The method of claim 13, wherein the one or more hollow spheres comprise one or more pharmaceutical compositions.

15. The method of claim 1, wherein the precursor species comprises one or more of quantum dots, magnetic nanoparticles, and preformed nanocrystallines.

16. The method of claim 15, wherein the one or more hollow spheres comprise one or more of quantum dots, magnetic nanoparticles, and preformed nanocrystallines.

17. A method for fabricating nanofoam comprising:
providing a homogeneous precursor solution comprising a first hydrophobic solvent and one or more anhydrous precursor species;

forming aerosol droplets having a first size distribution using the homogeneous precursor solution in an anhydrous carrier gas;

transporting the aerosol droplets through an aerosol reactor containing a reactant, wherein one or more chemical reactions occurs at a surface of the aerosol droplet to form partially consolidated hollow sphere; and aggregating partially consolidated hollow spheres to form nanofoam.

18. The method of claim 17, wherein the first hydrophobic solvent comprises one or more anhydrous volatile inert hydrophobic solvents and the reactant comprises water.

19. The method of claim 18, wherein the precursor species comprises one or more of metal alkoxides and metal chlorides.

20. The method of claim 19, wherein the precursor species comprises one or more of tin, germanium, titanium, silicon, zinc, zirconium, cadmium, lead, and mercury.

21. The method of claim 19, wherein the nanofoam comprises one or more of a metal oxide shell and a metal shell.

22. The method of claim 17, wherein the first hydrophobic solvent comprises one or more anhydrous volatile inert hydrophobic solvents and the reactant comprises one or more of hydrogen sulfide, volatile sulfides, hydrogen, and aldehydes.

23. The method of claim 19, wherein the nanofoam comprises one or more of a metal shell and a metal sulfide shell.

24. The method of claim 22, wherein the metal is selected from the group consisting of silver, copper, gold, platinum, palladium, zinc, zirconium, cadmium, lead, and mercury.

25. The method of claim 17, wherein the nanofoam comprise one or more of pharmaceutical composition, quantum dots, magnetic nanoparticles, and preformed nanocrystallines.

* * * * *